US008010440B2

(12) United States Patent
Merold (10) Patent No.: US 8,010,440 B2
(45) Date of Patent: Aug. 30, 2011

(54) ELECTRONIC TRADING SYSTEMS

(75) Inventor: Michael Merold, Sparta, NJ (US)

(73) Assignee: EBS Group Limited, London (GB)

( * ) Notice: Subject to any disclaimer, the term of this patent is extended or adjusted under 35 U.S.C. 154(b) by 913 days.

(21) Appl. No.: 11/106,506

(22) Filed: Apr. 15, 2005

(65) Prior Publication Data

US 2005/0240513 A1 Oct. 27, 2005

Related U.S. Application Data

(60) Provisional application No. 60/562,433, filed on Apr. 15, 2004.

(51) Int. Cl.
*G06Q 40/00* (2006.01)
(52) U.S. Cl. ........................................................ 705/37
(58) Field of Classification Search ............... 705/35–45
See application file for complete search history.

(56) References Cited

U.S. PATENT DOCUMENTS

| 6,871,198 | B2 * | 3/2005 | Neal et al. ......................... 707/3 |
| 2001/0042040 | A1 * | 11/2001 | Keith ............................. 705/37 |
| 2002/0010674 | A1 * | 1/2002 | Kent ............................... 705/37 |
| 2002/0143685 | A1 * | 10/2002 | Horsfall et al. .................. 705/37 |
| 2003/0055775 | A1 * | 3/2003 | McQuain ......................... 705/37 |
| 2003/0093360 | A1 * | 5/2003 | May ................................ 705/37 |
| 2003/0130931 | A1 * | 7/2003 | Mirlas et al. .................... 705/37 |
| 2003/0172025 | A1 * | 9/2003 | Gallina ............................ 705/38 |
| 2004/0128230 | A1 * | 7/2004 | Oppenheimer et al. ......... 705/38 |
| 2005/0125329 | A1 * | 6/2005 | Gerhart et al. .................. 705/37 |

FOREIGN PATENT DOCUMENTS

| EP | 399850 | 12/2001 |
| GB | 2 375 405 A | 11/2002 |
| WO | WO 93/15467 | 8/1993 |
| WO | WO 01/98968 | 12/2001 |

* cited by examiner

*Primary Examiner* — Rajesh Khattar
(74) *Attorney, Agent, or Firm* — Dickstein Shapiro LLP (57) ABSTRACT

An anonymous trading system allows parties to divide potential counterparties into tiers according to their perceived creditworthiness and the risk involved in trading with them. Price adjustments are applied to order prices for all tiers other than the first so that second and subsequent tier counterparties trade at less favorable prices. An offer is converted into a series of linked orders, one per tier, all at different prices. Tier identifiers attached to the orders are compared to ensure that the correct tier prices are displayed to counterparties.

37 Claims, 5 Drawing Sheets

BCDE

TIER 1 - [ALL EXISTING TRADING FLOORS HAVING CREDIT ON THE ANONYMOUS TRADING SYSTEM]

TIER 2 - XYZA
XYZB

TIER 3 - ABCY
ABCZ

FIGURE 3

| Tier \ CCY | EUR/USD | USD/JPY |
|---|---|---|
| 1 | 0 | 0 |
| 2 | 2 | 5 |
| 3 | 4 | 10 |
| 4 | - | - |

ELECTRONIC TRADING SYSTEMS

CROSS REFERENCE TO RELATED APPLICATION

This application claims benefit of U.S. Provisional Application No. 60/562,433, filed Apr. 15, 2004, which is hereby incorporated by reference.

FIELD OF THE INVENTION

This invention relates to electronic trading systems, and in particular to increasing the liquidity of tradable products traded on electronic trading systems.

BACKGROUND TO THE INVENTION AND STATE OF THE ART

Electronic trading systems have gained widespread acceptance over recent years for trading a wide variety of tradable products including financial instruments, and in many financial markets are the preferred mode of trading financial instruments such as equities products or foreign exchange products. In the foreign exchange (FX) market, anonymous trading systems have become the most common method of trading FX spot. Two main systems have gained acceptance, Reuters Dealing 2000 provided by Reuters plc and EBS provided by EBS Dealing Resources Inc. The Reuters product is described in EP-A-399850 and the EBS product is described in WO 93/15467. These systems are anonymous in that traders submit bids and offers into the system that are displayed to other traders without any indication of who has submitted the quote. A trader who wishes to deal a quote does not know the identity of the party with whom he is dealing until the deal has been completed. To avoid trades being executed with parties the traders' banks consider uncreditworthy, each trading floor trading on the systems enters credit limits for each possible counterparty on the system. These credit limits set a maximum value for trades with each possible counterparty and reflect the institution's assessment of their exposure risk by trading with those counterparties. If an institution does not wish to trade with a given trading floor it will set the credit limit for that trading floor to zero.

In both the Reuters and EBS systems as implemented, a first credit check is made before a bid or offer is displayed to traders on a trading floor. If the owner of that quote has no credit with that trading floor, or vice versa, there is no possibility of a deal between the two parties and the quote is filtered out and not displayed to the trading floor. This check is based on the existence or non-existence of credit and not the actual amount of credit required. Once a deal has been negotiated, a further credit check is performed to ensure that each party has sufficient actual remaining credit for the whole amount of the deal. Where insufficient credit remains on one side or the other, the value of the deal may be reduced by the system to reflect the actual available credit.

The Reuters and EBS systems have been very successful in the major currency pairs dealt on the FX markets. However, the systems are only used by, and intended only for use by, major financial institutions. The nature of the systems, and the currency pairs dealt, is such that it is unattractive for large institutions to trade with smaller or less creditworthy institutions, or even large corporate customers. For the major currency pairs such as USD:EUR or GBP:USD this does not hinder operation of the systems as there is sufficient liquidity in the market for the market to operate properly.

However, the smaller players are effectively excluded from trading and seeing many of the best prices. For the less active currency pairs, it can even prevent sufficient liquidity being achieved in the market for that currency pair to make trading on the anonymous system a viable proposition.

SUMMARY OF THE INVENTION

There is a need, therefore, for a system which allows smaller institutions, or less creditworthy institutions, to be able to trade effectively on trading systems with major financial institutions. Not only does this increase the viability of less commonly traded currency pairs, it also increases the liquidity of the more major currency pairs providing a more effective and transparent market.

The invention aims to address this need by introducing the concept of credit tiers. A party can assign each potential counterparty to one of a number of credit tiers. The tiers indicate the party's assessment of the relative creditworthiness of the potential counterparties. To compensate for the increased risk of trading with counterparties in lower tiers, the prices displayed to those counterparties are adjusted to increase the profitability of the trade to the maker party.

More specifically, there is provided a trading system for matching orders between counterparty trading floors, in which a market maker trading floor submits orders into the system for matching with compatible taker trading floor orders, the system comprising: a tiering component at said maker and taker trading floors for assigning potential counterparty trading floors to one of a plurality of tiers; and a price adjustment component for adjusting the price of orders submitted by said market maker trading floor and communicated to potential taker trading floors for trading in accordance with the tier to which said taker trading floors have been assigned by said market maker trading floor, the order prices being adjusted for potential taker trading floors assigned to at least one of said tiers.

The invention further provides a method of operating a trading system for matching orders between counterparty trading floors in which a market maker trading floor submits orders into the system for matching by the system with compatible taker trading floor orders, the method comprising: at maker and taker trading floors, assigning potential counterparty trading floors to one of a plurality of tiers; and adjusting the price of orders submitted by a market maker trading floor that are communicated to potential taker trading floors for trading in accordance with the tier to which the taker trader floors have been assigned by the market maker, the order prices being adjusted for potential taker trading floors assigned to at least one of the tiers.

The invention further provides an electronic trading system for matching orders between counterparties comprising: a plurality of trading floors each including at least one order input device for trading on the system; a matching engine for matching orders entered into the system from order input devices according to matching criteria; an order distribution component for distributing dealable orders to trading floors on the basis of compatibility criteria, each order including an order price; a store of tiers to which trading floors have assigned other potential counterparty trading floors trading on the system; and a store of price differentials to be applied to order prices submitted by trading floors to form orders having adjusted order prices, for distribution to potential counterparty trading floors assigned by the trading floor submitting the order to at least one of the tiers, whereby the prices distributed to counterparties are dependent on the tier to which each counterparty has been assigned.

Embodiments of the invention have the advantage that different prices can be shown to various counterparties depending on how their risk is assessed by a market maker. This encourages market makers to extend credit to counterparties with which they would otherwise not trade using the known systems. This, in turn, increases the liquidity in the fungible being traded and is advantageous to all parties on the system.

Preferably, the tiered prices are achieved by forming a linked order from an order input into the system by a market maker. A separate order is created for each tier and the orders are linked together at least by amount and preferably also by status and done deal information.

Preferably, each of the linked orders includes a tier identifier, whereby individual orders of the linked orders are only available for trading to potential taker trading floors assigned to the same tier as the tier identifier. In this way, the system ensures that the correct prices are shown to counterparties according to the tiering to which they have been assigned.

As the orders are preferably linked by amount, status and done deal information, any change in the status of one order is shown as a change in status of all of the orders in the linked set. Similarly, if a portion of one of the orders is executed, the amount of the rest of the linked set of orders is reduced by the same amount.

Preferably, the price adjustments for each tier, and the tiers to which each counterparty has been allocated by each potential maker are stored as a series of tables. Separate price adjustments may be stored for each fungible traded on the system.

Preferably, separate tables of price adjustments are stored on the system for each potential maker trading floor. Preferably, the price adjustments and the tiering information are input into the system from trading floors, preferably by a trading floor administrator workstation.

Preferably, the system comprises dealable price determination and distribution means for examining orders submitted into the system and determining, on the basis of compatibility criteria, which counterparties are eligible to deal orders submitted, and for distributing orders to eligible counterparties, the dealable price determination and distribution means comprising means for comparing the tier identifier of an order with the tier assigned to each counterparty trading floor by the maker trading floor submitting the order and rejecting counterparties as ineligible to deal the order if the compared tiers are not the same.

Preferably, the order matching means comprises a comparator for comparing the tier allocated to the taker's trading floor by the maker's trading floor and the tier allocated to the maker's trading floor by the taker's trading floor and for rejecting the match of the tiers compared by either the first or second comparators do not match.

The trading system may be an anonymous trading system and the fungibles traded may be financial instruments, for example foreign exchange (FX) products. The system may trader a plurality of different fungibles.

The invention also provides an electronic trading system for matching orders between counterparties comprising: a matching engine for matching orders submitted from trading floors according to matching criteria; an order distribution system for distributing orders including order prices to trading floors; a store of tiers to which trading floors have assigned potential counterparty trading floors trading on the system; a store of price differentials to be applied to order prices submitted by trading floors for distribution to potential counterparty trading floors assigned to at least one of the tiers of the trading floor submitting the order; and a linked order generator for generating from the submitted order, a plurality of linked orders, each order of the linked orders corresponding to a tier, the order price of at least one of the orders being adjusted from the submitted order price by the stored price differential for that order, the linked order generator comprising a tier identifier for adding a tier identifier to each of the linked orders whereby the order corresponding to a given tier is distributed only to potential counterparties assigned to the same tier by the party submitting the order.

The invention still further resides in a computerised trading system for matching orders between counterparty trading floors in which a market maker trading floor submits orders into the system for matching by the system with compatible taker trading floor orders, the system having software for performing the steps of: at trading floors, assigning potential counterparty trading floors to one of a plurality of tiers; and adjusting the price of orders submitted by a market maker trading floor that are communicated to potential taker trading floors for trading in accordance with the tier to which the taker trader floors have been assigned by the market maker trading floor, the order prices being adjusted for potential taker trading floors assigned to at least one of the tiers.

In one preferred embodiment, first tier prices are unadjusted, but second tier prices are increased by one pip for offers and decreased by one pip for bids. A further pip is added or subtracted for next tier customers and for each subsequent tiers.

Thus, the prices displayed to counterparties will be adjusted according to their credit tiering. Embodiments of the invention have the advantage that it becomes financially advantageous to extend credit to smaller or less secure financial institutions as the margin per deal is increased. The increased profit, compared to a trade with a more secure large institution compensates for the increased exposure and makes trading with the smaller institutions worthwhile.

From the point of view of the smaller institution, they gain access to a vast pool of liquidity to which they previously did not have access. Although they pay a premium for this access, in that they cannot deal at as favourable prices as large institutions, they have access to a very liquid and transparent market and can still trade at much more favourable prices than would be available to them otherwise.

BRIEF DESCRIPTION OF THE DRAWINGS

Embodiments of the invention will now be described, by way of example only, and with reference to the accompanying drawings, in which.

DESCRIPTION OF PREFERRED EMBODIMENTS

In the following description, the concept of credit tiering will be described and then its implementation on an anonymous trading system discussed. This system is currently administered by EBS Dealing Resources Inc and based on the system disclosed in WO 93/15467, the contents of which are incorporated herein by reference. However, it is to be understood that this is merely an exemplary description. The principle of credit tiering is applicable to any trading system in which credit is assigned by one counterparty to others. It is not limited to systems that operate on the basis of bilateral credit but extends to systems where credit limits are only extended in one direction. From an architectural point of view, credit tiering may be implemented, for example, using a distributed architecture such as those disclosed in WO 93/15467 or WO 01/98968 or using a host based architecture such as that disclosed in EP-A-399850.

Credit tiering allows a market maker, that is a party who submits a quote into the market, to submit a single quote into the market and that quote is then displayed to various potential takers, that is parties who may deal the quote, at different prices dependent on the taker's creditworthiness as assessed by the maker.

Credit tiering allows the maker to segment the market according to their perception of various possible takers' creditworthiness and makes prices available to all market segments. The taker is provided with greater liquidity than would otherwise be available and, for some less creditworthy takers, provides access to liquidity that would be denied on existing systems.

The system defines a plurality of tiers that are made available to the market. In one preferred embodiment four tiers are defined although this is a matter of choice only. The first tier consists of potential counterparties' trading floors with the highest creditworthiness and the fourth tier, those potential counterparty trading floors with the lowest creditworthiness. Tiers two and three represent positions of intermediate creditworthiness. These tiers are made available to trading floors but it is left to individual counterparties to decide how many of the available tiers they wish to use.

Market makers assign all possible counterparty Trading floors to one of the tiers. The larger, more creditworthy counterparties, are assigned to tier one, representing the smallest risk and smaller, less secure floors are assigned to tiers 2, 3 and 4 according to the market maker's assessment of the risk. In effect, all parties subscribing to the system will tier all other parties as any party becomes a market maker as soon as they submit a quote into the system.

When assigning parties to tiers, market makers also assign a price differential to all tiers other than tier one on a currency pair basis. Thus, a currency pair specific differential is applied. This differential is added to offers and subtracted from bids, spreading the price available to the higher tiers. The differential increases for each higher tier, for example, for one currency pair the differential may be one pip for tier 2, two pips for tier 3 and five pips for tier 4.

Market makers submit quotes into the system in the same manner as prior art systems. That is, a single quote is entered into the market. The price of this quote is the regular price with no differential applied. In other words, the price entered is the tier 1 unbiased price.

The system prepares individual market views for each trading floor based on the tiering assigned by the market maker. Thus, a tier 1 counterparty trading floor sees the quote at the tier 1 unbiased price, but a tier 2 counterparty trading floor will see the price with the one pip differential applied. Similarly, tier three and four counterparties will see the price with the two and five pip differentials applied. The counterparty trading floors will not know that they are seeing a biased price, nor will they be aware of the tier to which they have been assigned by any given market maker.

When a taker hits a price to deal that price the deal will be executed on the price available to the trading floor to which the trader is assigned. Deals are executed on a first come first served basis up to the value of the maker's quote in the same manner as existing trading systems such as that disclosed in WO 93/15467.

It can be seen that the maker makes an extra profit when trading with one of the tier two, three or four counterparties. This additional profit offsets the additional risk taken by the maker. Principally the risk is an assessment of whether or not the counterparty will settle the trade. The extra available profit encourages makers to extend credit to counterparties with whom they would otherwise not be prepared to trade.

Figure 1:
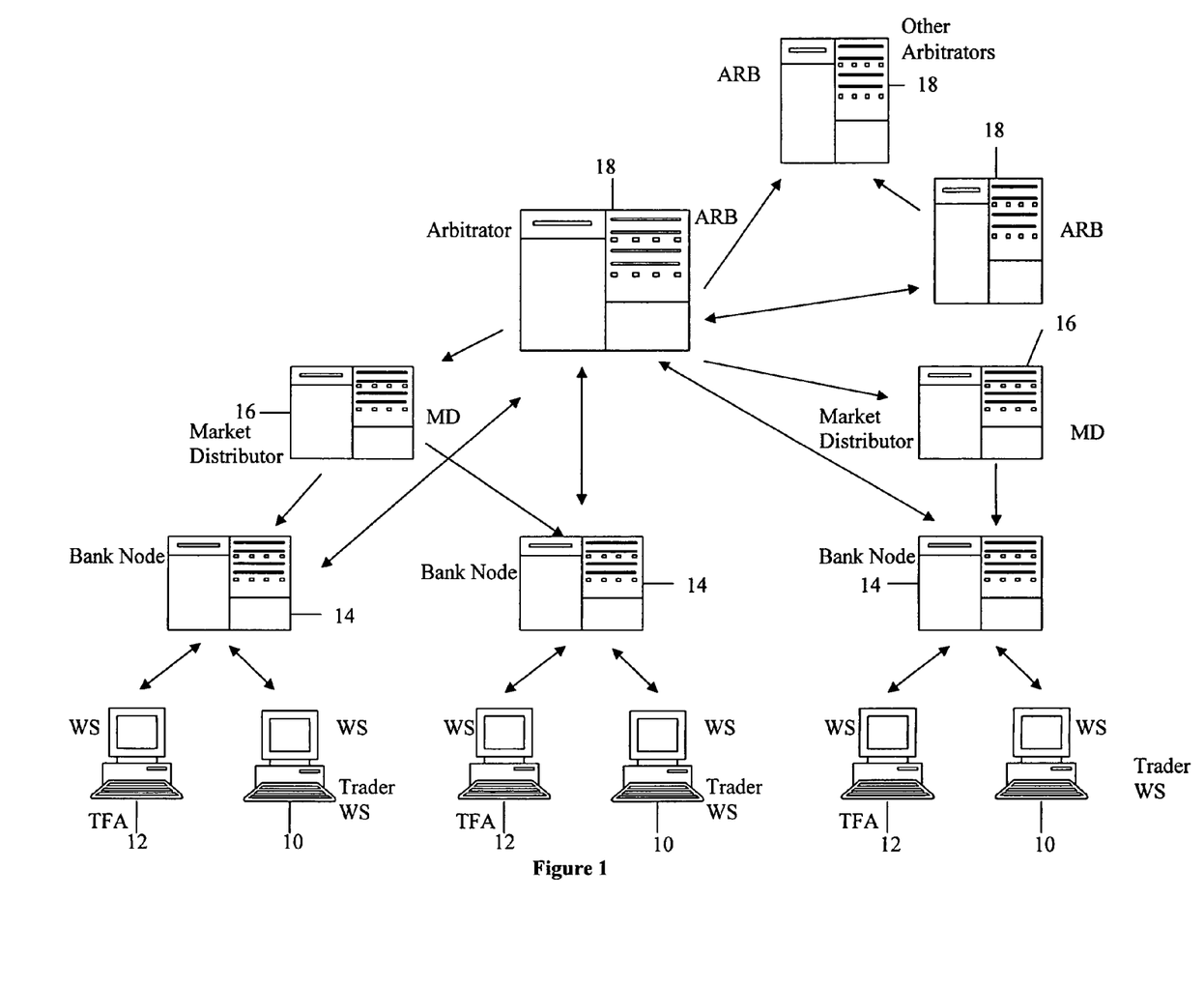
FIG. 1 is a schematic diagram of the architecture of a known anonymous trading system.
Figure 2:
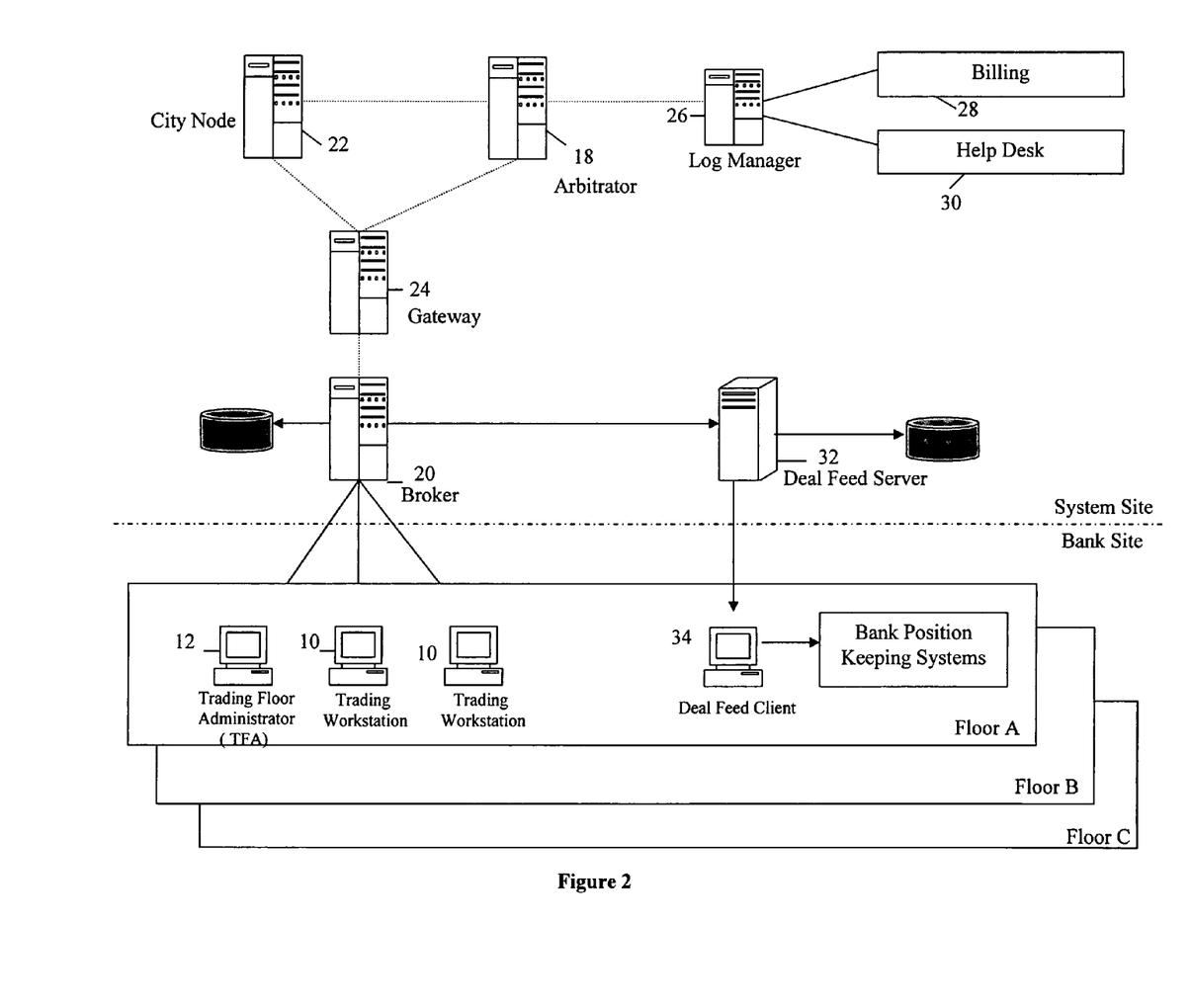
FIG. 2 is a variant of the architecture of FIG. 1.

The manner in which credit tiering can be implemented will now be described with reference to FIGS. 1 and 2. FIG. 1 is a schematic diagram of an anonymous trading system very similar to that disclosed in WO 93/15467. The only major difference is that the market access nodes have been removed and replaced by a bank node at each bank. In the system of FIG. 2, broking nodes replace the market distributors and the bank nodes, providing the same functionality.

Referring to FIG. 1, trader terminals are grouped, logically, by trading floors. The trader terminals include input means such as a keyboard, keypad, mouse or voice recognition software to enable traders to input bids and offers into the system. The terminal includes a display which displays to the trader a view of the market in a variety of currency pairs that can be traded on the system. The display can also show other information such as deals the trader has done, and deals that have been done as a whole over the system. Instead of a trader terminal, some other form of order input device may be used. One possibility is an automated trading interface which submits orders to the trading system according to market conditions and based on a trading algorithm. Each trading floor also has a trading floor administrator terminal 12. This terminal is used to monitor the activities of the trader terminals and is used to input credit limits into the system. As will be described in detail, it is also used to input credit tiering information.

The trading floor terminals 10 and trading floor administrator 12 communicate with the system via a bank node 14 which, as it its name suggests, is located at the institution to which the trading floor belongs. One of the functions of the bank node is to detail actual credit limits extended by the trading floor to all potential counterparties.

Bank nodes communicate with the system via market distributors 16. The market distributors maintain views of the market unique to each trading floor and distribute these views in regular updates. Quotes entered into the market by a party with whom a given trading floor has no credit are filtered out of the market view sent to that trading floor by the market distributor that maintains a YES/NO credit matrix to enable market views to be developed. The matrix does not include actual credit limits but merely records the existence or absence of bilateral credit between all possible counterparties to a transaction.

Matching of quotes and deal execution is performed by the arbitrators 18. The arbitrators maintain the trading book and match quotes submitted by takers with maker quotes according to market and matching rules.

The system of FIG. 2 differs only in that the bank nodes 14 and market distributors 16 are replaced by broking nodes 20 which perform the same functions. Thus, the broker node is responsible for increasing the price distribution, order/hit submission, deal status/notification, trader profile information, entitlements, credit limits and settlement instructions.

The view shown in FIG. 2 is slightly different to that of FIG. 1 in that a city node 22 is arranged between the broker 20 and the arbitrator 18 (the other arbitrators not being shown). The city node receives input from a number of brokers to reduce communications overheads. A gateway 24 is arranged between the broker 20 and the arbitrator 18 and city node 22 and a log manager 26 communicates with the arbitrator 18 and a billing system 28 and help desk 30.

The broker is connected to a deal feed server 32 which communicates deal information to a deal feed client 34 at the trading floors. Credit tiering impinges on the operation of three areas of the trading system: the trading floor administrator; the manner in which quotes are processed; and the screening for credit performed by the market distributor or broker nodes.

Trading floor administrator terminals are used to assign each possible counterparty floor to a tier, and to assign price differentials to each tiers for each currency pair the trading floor may wish to trade.

Quote processing is affected in that the manner in which quotes are processed is different from conventional systems as each quote input into the system becomes a different value quote in each tier.

Credit screening is the process by which the market distributor or broking node filters quotes to produce dealable market prices. It contributes to the order matching process by ensuring that the maker and taker have bilateral credit. It is affected as the market distributor or broking node must know the tiering assignments in order to be able to prepare appropriate market views for all the parties.

The concepts of orders, trading floors and the market, as used within an anonymous trading system will now be discussed as these are fundamental to the operation of credit tiering within an anonymous trading system.

An order is an expression of willingness on behalf of a party to engage in an exchange of some given asset, such as a currency pair. This exchange is referred to as a deal. Anonymous trading systems such as that disclosed in WO 93/15467 generally support two different types of orders: quotes and hits. Quotes are persistent orders, that is they remain in the market until they are fulfilled by one or more deals or removed by the trade. Hits are transient orders which are completed quickly and automatically result in zero or more deals. Hits are sometimes referred to as "fill-or-kill" deals meaning if they cannot be dealt immediately they are cancelled. A willingness to buy is expressed as a bid quote or a buy hit, whereas a willingness to sell is expressed as an offer quote or a sell hit.

Deals are result of the system, the arbitrator 18 in the case of the systems of FIGS. 1 and 2, matching two compatible orders. Compatibility is determined by market rules as follows:

Matchable orders must be of a compatible type; there must be a buy order and a sell order. A bid quote is compatible with a sell hit or an offer quote; an offer quote is compatible with a bid quote or a buy hit. Buy hits are not compatible with sell hits as they are both invisible orders which are not displayed to traders.

Matchable orders must be price compatible. The buy side price must not be lower than the sell side price.

The trading floors from which the orders were submitted must have market compatibility. One example of compatibility for an FX spot deal is the existence of bilateral credit between the parties.

The trading floor is, within the context of an anonymous trading system, an abstraction based on traditional concepts of a trading floor as a physical place where traders meet to trade with other traders on behalf of their employer institutions.

Within the context of an anonymous trading system, a trading floor is an agglomeration of individual trader terminals at an institution or branch of an institution. Often these will be located physically in the same room, but need not be. The trading floor abstraction gives identity to market participants. Each dealer or trader is identified to the market by their trading floor identity rather that their individual identity. Trading floors own the information required to participate in the market, such as offer/bid values and credit limits.

When a dealer submits a quote into the market, the quote is visible to other dealers based on the market compatibility of the submitting dealer's trading floor and the viewing dealer's trading floor. Quotes are sorted into order books according to their price and time of submission. The prices become visible based on this sort order and market compatibility.

Trading floors retain information required to participate in the market. The market uses this information to enforce dealing rules. Credit is an example of this information. Two trading floors must have bilateral credit for market compatibility to exist. Bilateral credit exists only if both floors independently grant credit to each other. Each trading floor must contribute its credit information to the market before it can participate in the market.

The concept of the market is one of a forum for dealing and is central to the system. The market keeps the rules and information governing the trading system behaviour. Market participants access the market on behalf of their trading floor. When trading floors join the market they provide the market with information that allows the market to determine market compatibility.

Market compatibility is used to calculate dealable prices and to match orders. Dealable prices are calculated from orders that have market compatibility with the observing participant. A participant may aggress on a dealable price by submitting an opposing order. The trading system responds by matching the aggressing order with the existing orders in the market based on market compatibility.

Turning now to the implementation of credit tiering, the modifications required for administration, order processing and market compatibility will be described in turn.

The trading floor administrator 12 shown in FIGS. 1 and 2 is responsible entry of counterparty credit limits for a trading floor. It is also responsible for configuring the tiering which requires each counterparty to be assigned to a tier. The maximum number of tiers that can be assigned is limited by the system, in the example giving earlier, there were four tiers. The trading floor administrator (TFA) may use some or all of three tiers.

Figure 3:
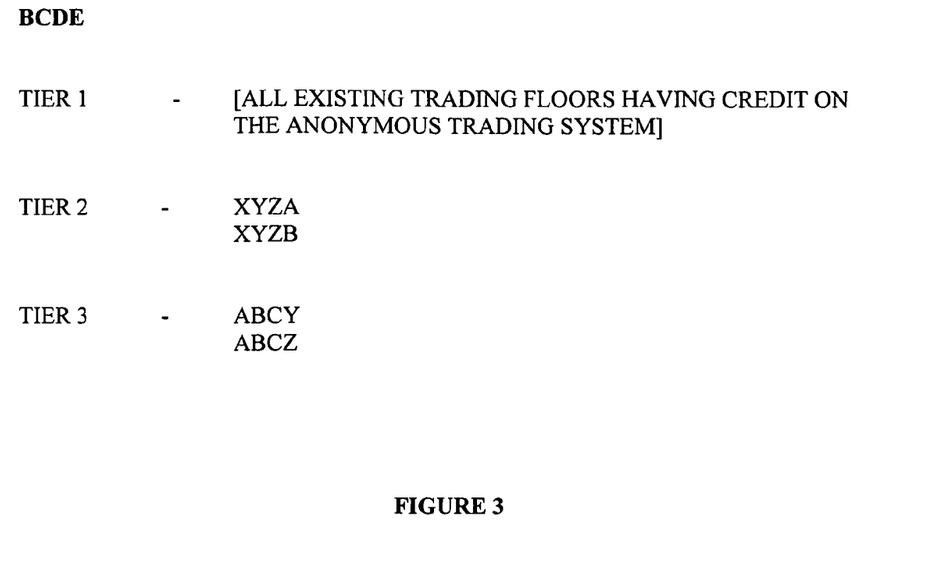
FIG. 3 shows how counterparties may be assigned to different tiers.

FIG. 3 shows an example of the tiering selected by a trading floor BCDE. This trading floor decides to use three different tiers. The allocation of counterparties to different tiers will be decided by risk management personnel at the trading floor and then entered into the TFA workstation. In the example of FIG. 3, it is decided that all parties with whom the trading floor already has a credit relationship on the conventional anonymous trading system will be tier 1 counterparties. This means that the trading floor will continue to trade with these counterparties on the same basis as before with no price differentials applied. The risk managers decide to establish credit with four new floors, XYZA and XYZB as tier 2 counterparties, and ABCY and ABCZ as tier 3 counterparties. XYZA, XYZB are viewed as small trading floors with a medium level of risk, whereas ABCY, ABCZ are small floors with a higher level of risk. The risk managers decide not to assign any trading floors to tier 4, the highest risk category. The administrator runs a credit tiering application on the trading floor administrator workstation to assign the four new trading floors to their selected tiers.

Figure 4:
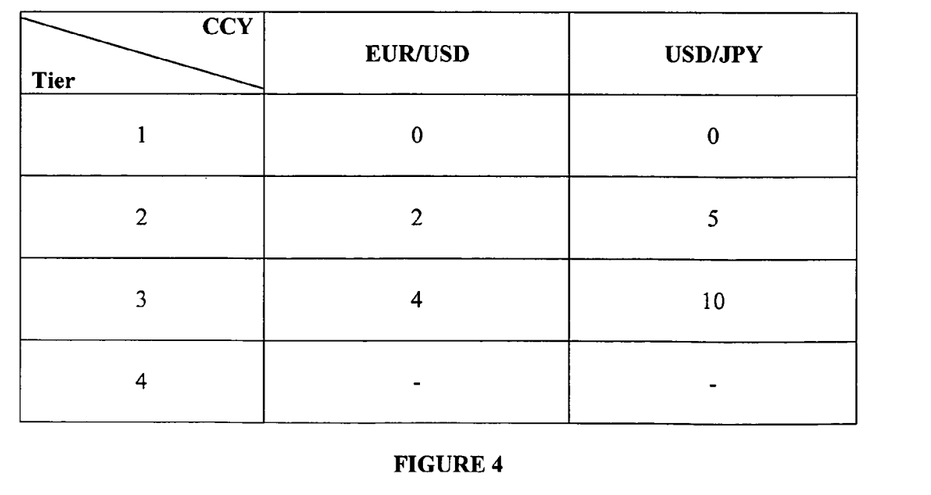
FIG. 4 shows how differentials may be assigned to each tier by a party on a currency pair basis.

The trading floor administrator must now select a price differential for each tier, other than the first, that is being used, for each currency pair that traders on the trading floor may wish to trade. In practice, it is not unusual for a trading floor to trade in a few tens of currency pairs. However, for ease of explanation, it will be assumed that traders on floor BCDE will only trade in two currency pairs, EUR/USD and USD/JPY. The price differentials are shown in FIG. 4. The risk managers decide that there will be a two pip differential at tier 2 counterparties for EUR/USD and 5 pips at tier 2 for USD/JPY. For tier 3, the differentials are four and ten pips respectively. These differentials are input into the TFA workstation and communicated to the market distributor (FIG. 1) or the broker node (FIG. 2).

Now that the tier differentials have been set, if a BCDE dealer enters a bid quote of 0.9562 in EUR/USD, tier 1 floors will see 0.9562, tier 2 floors will see 0.9560 and tier 3 floors will see 0.9558. If it was an offer quote, tier 1 floors would still see 0.9562, but tier 2 floors would see 0.9564 and tier 3 floors 0.9566.

The manner in which orders are processed in a credit tiered environment will now be discussed. From a technical standpoint, credit tiering poses the problem of how to process a single order submission from the dealer as if it had multiple prices. It is neither correct to process it as a single order nor as separate orders equal in number to the number of tiers. The inventor has realised that this problem may be overcome elegantly by treating the single submitted order as a plurality of orders, one per tier, with a price calculated by applying the tier's differential. However, these orders are not independent of each other but are linked, at least in terms of amount. Thus, operations involving the amount of one of the linked orders affect all the orders in the linked set of the plurality of input orders simultaneously.

Thus, when the dealer at institution BCDE submits a EUR/USD bid for, say 5 million, the system responds by creating three orders, one with no price differential for tier 1 counterparties, one with a tier 2 price differential applied, and one with a tier 3 price differential applied. If a dealer from institution ABCZ hits that bid, remembering that credit has been extended by BCDE to ABCZ and that ABCZ is a tier 3 institution, and the amount of the hit is 1 million, a deal with ABCZ is initiated and 1 million of the 5 million bid amount is reserved, pending deal completion including credit checking. The amount reserved must be reserved from all three of the orders that were created: the tier 1, tier 2 and tier 3 orders despite the hit being at the tier 3 price. Thus, all three bids remain in the market at 4 million.

In the above example, the use of linked orders sharing the order amount was illustrated. A technical problem arises in how the system displays order status information properly to the dealer where there are a plurality, in this case three, of orders in play but the trader has only input one order and visualises only a single order. In other words, the system is processing the trader's order in a manner that is different from the trader's perception of the order to overcome the technical problem of applying the tiering differentials to various counterparties.

The solution to this further technical problem is for the linked orders preferably to share status and preferably done deal information as well as the amount. In any given deal, there is a small chance that orders may be cancelled due to an internal trading system condition. It would be inconsistent if a single order in the set of linked orders was cancelled, leaving the remaining orders in the set active. This problem can be resolved by all the orders in the set of linked orders sharing status information such that if the order is cancelled by the system or interrupted by the dealer, all orders change status simultaneously. Done deal information is also shared such that a done deal against one of the orders in the linked set appears to have been done against all the orders.

Of course, if a trader cancels a linked order, the entire linked set will be cancelled as the trader is only aware of there being a single order. An instruction from the trader to cancel an order is treated as an instruction to cancel all the linked set of orders that was created from an input order.

A further technical problem that arises is how to deal with a feature known as red dealable quote. This functionality is described in EP-A-0847561 and provides the dealer with feedback on the dealer's order position in the market with respect to other orders of the same type and currency pair. A quote is "red" when its price is part of the dealable regular amount market view for a given percentage of market compatible counterparties. This percentage is referred to as the red quote threshold. The purpose of the red quote is to indicate to dealers that their quote is visible to a significant number of counterparties and is likely to be hit or taken to initiate a deal. Thus, the trader has a feel for how competitive their quote is compared to others in the market. A red quote is displayed in red on the trader's display. The motivation for red quotes comes from the filtering of quotes to eliminates quotes for which a party has no credit from their market view. Thus each trading floor's market view is unique.

In order to provide meaningful information, the red quote processing may act to sum the number of counterparties who view, or who are distributed, the individual quotes in a linked set. This sum is then compared to the red quote threshold to determine the linked order red quote status. If the sum is greater than the red quote status then all the orders in the linked set are red and the dealer, who only sees the single order he put into the system, is shown the red quote indication.

In the systems of FIGS. 1 and 2, the market distributor and broking node respectively calculate dealable market prices. That is, they examine various attributes such as credit relationships between counterparties and other aspects of market compatibility as described above to calculate dealable market prices which can then be distributed to traders at trading floors. The manner in which this is done is well known in the art. However, the procedure for determination of market compatibility requires modification to take into account the tiering of orders. It is a requirement of credit tiering as described that counterparties should only deal against orders supplied for their tier. Thus, the market distributor must not distribute a tier 1 price to a trading floor that has been assigned to tier 2 by the counterparty owning that order.

In the illustrative example considered above, trading floor BCDE has assigned counterparties to three tiers: tiers 1, 2 and 3. Resulting from this, an order submitted by a trader from BCDE is processed by the system and converted into three linked orders with price differentials calculated on a currency pair basis from values input into the system by the trading floor administrator.

It is necessary for a tier attribute to be added to each of the quotes that make up the linked set to indicate to which tier each quote belongs. The tier attribute is used in the determination of market compatibility between counterparties in the calculation of dealable market prices. If the tier of a quote does not match the tier of a given counterparty as assigned by the counterparty owning the quote, then the quote is not compatible and cannot form the basis of a dealable market price that could be distributed to that counterparty. This check works in a similar manner to the credit check performed in the system of WO 93/15467 where a check is made against a yes/no credit matrix to determine market compatibility. A full credit check against actual credit values is only made after a market has been made as part of the deal extension process.

Figure 5:
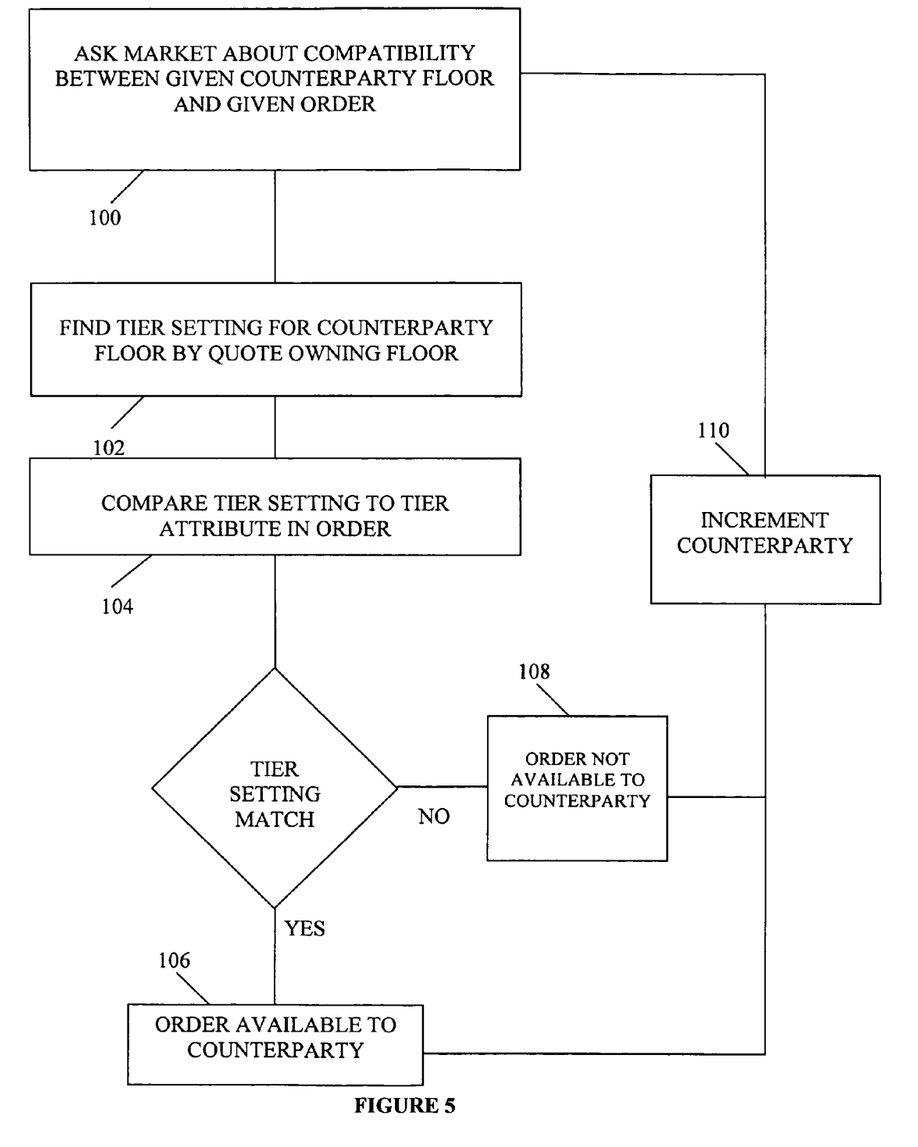
FIG. 5 is a flow chart showing how tiering affects market compatibility checking.

FIG. 5 shows the steps taken in the tiered compatibility check for market compatibility. At step 100, the market is asked about the compatibility between a given counterparty at a given order. At step 102, the tier setting for the counterparty trading floor is retrieved by the market. This is the tier setting as assigned by the owner of the order being considered. The tier setting for a given counterparty may be different for different counterparties. The market then, at step 104, compares the tier setting for the order, as indicated by the tier attribute with the retrieved tier settings. If the tier settings are the same, then the order is compatible and step 106 is made available to the counterparty, provided it passes all the other, conventional, market compatibility tests. If the tiers do not match then, at step 108 the order is not available to the counterparty regardless of other market compatibility tests. For a given order, the system then increments the counterparty and repeats steps 100 to 108 for the next counterparty. This process is repeated until the quote has been checked against all possible counterparty trading floors on the system. The process is repeated for each quote entered into the system by a party that has assigned tiers to counterparties on the system.

Figure 6:
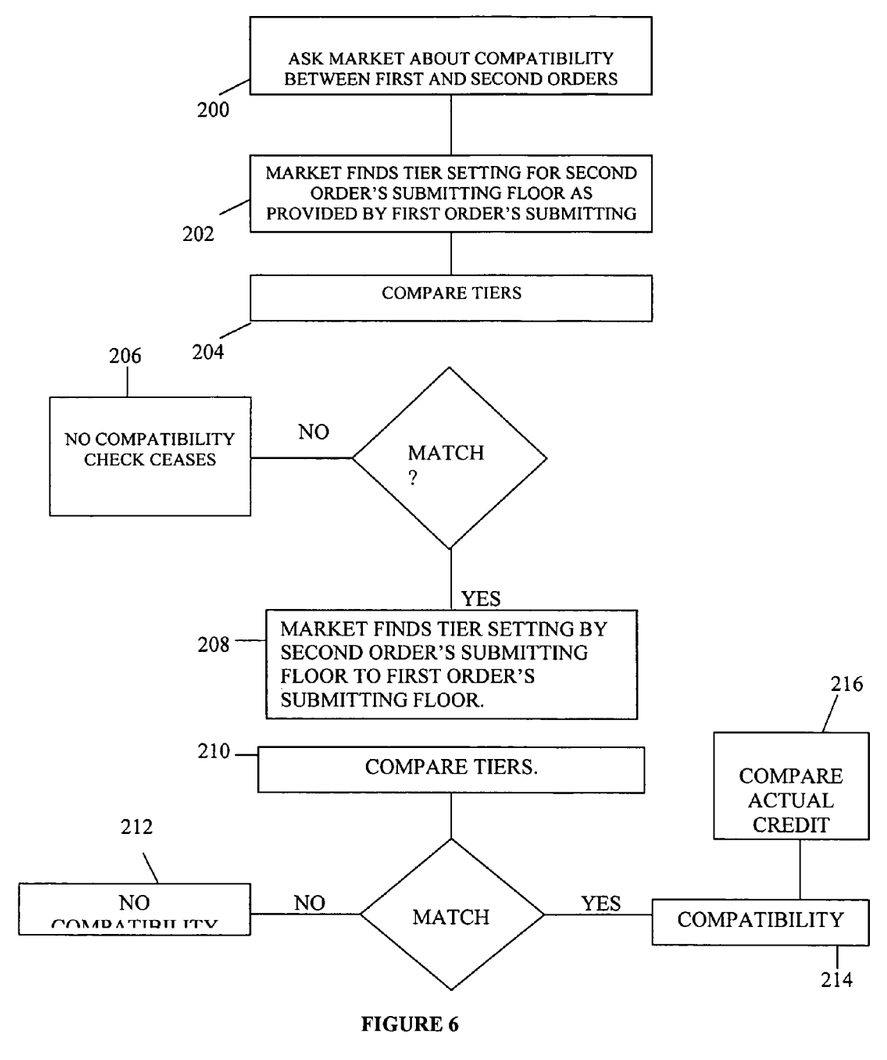
FIG. 6 is a flow chart showing how tiering affects order matching.

FIG. 6 shows the steps taken with matching orders where tiering has been used. In the embodiments of FIGS. 1 and 2, this matching is performed by the arbitrator, but most of the steps of FIG. 6 are performed by the market distributor or broker node on request from the arbitrator. The steps of FIG. 5 are all performed by the market distributor and broking node respectively. In other system architectures, different arrangements may be adopted, for example, in a centralised processing system using a host architecture, matching, market compatibility checking and market distribution are all performed by the host, and the steps of FIGS. 5 and 6 would all be performed by the host. At step 200 in FIG. 6, a message is sent by the matching engine, the arbitrator, to the market asking the market about compatibility between first and second orders that could be matched. The market, at step 202, finds the tier setting for the second order's submitting floor as provided by the first order's submitting floor and at step 204 compares these tiers. If they do not match, at step 206 the check ceases. If they do match, at step 208 the market finds the tier setting provided by the second order's submitting floor for the first order's submitting floor and at step 210 these tier values are compared. If they are not the same, then at step 212 there is no compatibility and a message to this effect is sent to the matching engine. If they are the same then at step 214 this is compatibility and a message to this effect is sent to the matching. In response to a further request from the matching engine, a check that there is sufficient actual bilateral credit remaining for the deal is made at step 216 before the deal can be executed.

In the foregoing description, the manner in which operation of the arbitrator and market distributors/broking nodes of the systems of FIGS. 1 and 2 are altered to implement tiering has been discussed.

Considering the system of FIG. 1, in the known system as has been implemented by EBS Dealing Resources Ltd, bank nodes located at trading floors maintain actual credit details and forward credit relationships to the arbitrator which in turn forwards them to the market distributor which maintains a yes/no credit matrix used to determine market compatibility. Credit tiers may be specifically assigned by the trading floor administrator via the bank nodes but this is not necessary.

Instead, the credit relationship may be organised into arrays or sets with each array corresponding to a tier. Thus, the credit relationship for tier 1 trading floors is sent first, followed by tier 2 etc. In this manner, no additional information need be sent, with the tiering information being conveyed by the grouping of the credit relationship information.

In addition, the trading floor administrator must submit to the arbitrator the tier-to-tier price differentials for each currency pair. These are then communicated to, and stored at the market distributor or broking node.

At the market distributor, the tiering information must be stored for retrieval in the market compatibility and order matching as described above. This may be as a series of look up tables, one per currency pair. The tables must, for each trading floor, indicate the price differential for each tier and the tier assigned to each counterparty. The tables may be stored in a dedicated database or be part of an existing database within the market distributor or broking node.

Traders submit orders to the system via QuoteSubmit and HitSubmit messages sent from the trading terminal to the arbitrator via the bank node. The nature of these messages is well documented in the art and they are, for example, described in WO-A-93/15467. The QuoteSubmit and HitSubmit messages are modified in accordance with embodiments of the invention to hold the tier number. If a tiering of 4 tiers is used, this requires an additional two bits in the messages or the replacement of redundant existing bits by tiering bits. Quote and hit messages are also sent to the market distributor/broker node and between arbitrators and require similar modification.

The linking of orders may be performed either on the arbitrator or the market distributor. In order to generate the linked orders, the arbitrator or market distributor must know the number of tiers used by the system and must retrieve the price differentials assigned by the party submitting the quote from the relevant table for that currency pair stored at the market distributor.

If the linked orders are generated at the market distributor they will then need to be communicated to the arbitrator and vice versa. The process of order generation comprises including the tier attribute for the order, and the linking of not only the amounts of the orders but preferably also order status and done deal information.

Linking orders on the market distributor has the advantage that only single quote updates need by sent from the arbitrator to the market distributor for linked sets of orders so saving bandwidth.

The examples described above are exemplary only and many variations are possible within the scope of the invention. For example the invention is not limited to foreign exchange transactions and may be applied to any fungible in which there is an element of risk in trading with counterparties. It is not limited to system in which bilateral credit is assigned and may be applied where credit relationships and tiering is unilateral. Furthermore, the invention is not constrained to any particular architecture but may be implemented on any suitable system which may be based on a host computer or a more distributed architecture as described in relation to FIG. 1 or 2 or some other architecture. Communications within the system may be based on a private communications network such as that used by the system of WO 93/15467 or may be based, fully or in part, on a public communications network such as the internet. Other variants are possible within the scope of the invention and will occur to those skilled in the art.

What is claimed is:

1. A trading system for matching orders between counterparty trading floors, in which an order received from a market maker trading floor is matched with compatible taker trading floor orders, the system comprising:
a receiver configured to receive an indication of one of a plurality of credit tiers, the credit tiers indicating trading floors' assessments of relative creditworthiness of potential counterparty trading floors; and
a price adjustment component configured to:
in response to the received credit tier indications, create, from the order received from the market maker trading floor, a plurality of separate orders, one for each credit tier, the plurality of separate orders having prices different from one another, the different prices being set in accordance with respective ones of the credit tiers and communicated to potential taker trader floors associated with the respective credit tiers;
link the plurality of separate orders together by a shared order amount to form a set of linked orders; and
when one of the plurality of orders in the set of linked orders is executed for a first amount, dynamically reduce the amount of each separate order of the set of linked orders by the first amount whereby at any given time the order amount of each of the separate orders created from the received order from the market maker is equal to the total untraded amount from the received order.

2. A trading system according to claim 1, wherein each order of said set of linked orders includes a tier identifier, whereby individual orders of the set of linked orders are only available for trading to potential taker trading floors assigned to the same credit tier as the tier identifier.

3. A trading system according to claim 1, wherein the orders of said set of linked orders are linked by status, whereby a change in the status of any of a linked set of orders causes the same change of status in all other orders in said linked set of orders.

4. A trading system according to claim 1, wherein the trading system is anonymous.

5. A trading system according to claim 1, wherein the matched orders are for a financial instrument.

6. A trading system according to claim 1, wherein the price adjustment component comprises a table of price adjustments for each of said credit tiers and a table of credit tiers allocated to each potential taker trading floor by each potential maker trading floor trading on the system.

7. A trading system according to claim 2, comprising a dealable price determination and distribution component for examining orders received by the system and determining, on the basis of compatibility criteria, which counterparties are eligible to deal the orders, and for distributing the orders to eligible counterparties, the dealable price determination and distribution component comprising a comparing component for comparing the tier identifier of an order with the credit tier assigned to each counterparty trading floor by the maker trading floor from which the order was received and rejecting counterparties as ineligible to deal the order if the compared credit tiers are not the same.

8. A trading system according to claim 2, comprising an order matching component for matching orders received from a maker trading floor and a taker trading floor, the order matching component comprising:
a comparator for comparing the credit tier allocated to the taker trading floor by the maker trading floor and the credit tier allocated to the maker trading floor by the taker trading floor and;
a component for rejecting the match if the credit tiers compared by the comparator do not match.

9. A trading system according to claim 5, wherein the financial instrument is a foreign exchange (FX) product.

10. A trading system according to claim 6, wherein the price adjustment component comprises a table of price adjustments for each potential maker trading floor trading on the system.

11. A trading system according to claim 6, wherein the system can trade a plurality of products and the tables of price adjustments are specific to each product.

12. A method of operating a computerized trading system comprising one or more computers, including at least one computer acting as a price adjustment component, for matching orders between counterparty trading floors in which orders received from a market maker trading floor are matched by the system with compatible taker trading floor orders, the method comprising:
at least one of the one or more computers receiving an indication of one of a plurality of credit tiers, the credit tiers indicating trading floors' assessments of relative creditworthiness of potential counterparty trading floors; and
at least one of the one or more computers, at the price adjustment component:
in response to the received credit tier indications, forming, from each order received from the market maker trading floor, a plurality of separate orders, one for each credit tier, the plurality of separate orders having prices different from one another, the different prices being set in accordance with respective ones of the credit tiers and communicated to potential taker trader floors associated with the respective credit tiers;
linking the plurality of separate orders together by a shared order amount to form a set of linked orders; and
when one of the plurality of orders in the set of linked orders is executed for a first amount, dynamically reducing the amount of each separate order of the set of linked orders by the first amount whereby at any given time the order amount of each of the separate orders created from any given received order from the market maker is equal to the total untraded amount from that received order.

13. A method according to claim 12, wherein the different prices are set, at the price adjustment component, for all but one of the credit tiers of potential taker trading floors.

14. A method according to claim 12, wherein a tier identifier is assigned to each order of the set of linked orders.

15. A method according to claim 12, wherein the different prices of the orders of the set of linked orders are calculated from tiering assignments received from the trading floors by the trading system and price differentials for each credit tier received from the trading floors.

16. A method according to claim 12, wherein the orders of said set of linked orders are linked by deal status, whereby a change in the status in any order of said set of linked orders causes the same change of status in all other orders in said set of linked orders.

17. A method according to claim 12, wherein the orders are matched on an anonymous trading system.

18. A method according to claim 12, wherein the orders matched are orders to trade a financial instrument.

19. A method according to claim 12, wherein the step of price adjusting, at the price adjustment component, comprises storing at the price adjustment component a table of price adjustments for each credit tier of said plurality of credit tiers and storing at the price adjustment component a table of credit tiers allocated to each potential taker trading floor by each potential maker trading floor trading on the system, adjusting, at the price adjustment component, the order price for each credit tier by the amounts stored in the table, and communicating the prices to potential taker trading floors from the price adjustment component in accordance with their stored credit tier.

20. A method according to claim 14, wherein the trading system includes at least one computer acting as an order matching component having a comparator for comparing credit tiers and at least one computer acting as a component for rejecting a match between orders, and wherein orders entered into the system are communicated to potential taker trading floors with which orders meet compatibility criteria, comprising comparing in the comparator the tier identifier of an order with the credit tier assigned to each counterparty trading floor by the maker trading floor submitting the order, and rejecting, in the component for rejecting a match, counterparties as ineligible to deal the order if the compared credit tiers are not the same.

21. A method according to claim 14, wherein the trading system includes at least one computer acting as an order matching component having a comparator for comparing credit tiers and at least one computer acting as a component for rejecting a match between orders, and wherein orders received from a maker trading floor are matched in the order matching component with orders received from taker trading floors, the order matching comprising comparing in the comparator the credit tier allocated to the taker's trading floor by the maker's trading floor to the credit tier allocated to the maker's trading floor by the taker's trading floor; and rejecting, in the component for rejecting a match, the match if the credit tiers compared do not match.

22. A method according to claim 18, wherein the financial instrument is a foreign exchange (FX) product.

23. A method according to claim 19, comprising storing, at the price adjustment component, separate price adjustments to be applied to orders received from each potential maker trading floor trading on the trading system.

24. A method according to claim 19, wherein the trading system trades a plurality of products, comprising storing tables of price adjustments at the price adjustment component for each product traded on the system.

25. A computerised trading system, including a computerised price adjustment component, for trading matching orders between counterparty trading floors, in which orders received from a market maker trading floor are matched by the system with compatible taker trading floor orders, the system having software for performing the steps of:
 the system receiving an indication of one of a plurality of credit tiers, the credit tiers indicating trading floors' assessments of relative creditworthiness of potential counterparty trading floors;
 in response to the received credit tier indications, forming, from each order received from the market maker trading floor, a plurality of separate orders, one for each credit tier, the plurality of separate orders having prices different from one another, the different prices being set in accordance with respective ones of the credit tiers and communicated to potential taker trader floors associated with the respective credit tiers;
 linking the plurality of separate orders together by a shared order amount to form a set of linked orders; and
 when one of the plurality of orders in the set of linked orders is executed for a first amount, dynamically reducing the amount of each separate order of the set of linked orders by the first amount whereby at any given time the order amount of each of the separate orders created from any given received order from the market maker is equal to the total untraded amount from that received order.

26. A system according to claim 25, wherein the software adjusts the order prices at the computerised price adjustment component for all but one of the credit tiers of potential taker trading floors.

27. A system according to claim 25, wherein a tier identifier is assigned to each order of the set of linked orders.

28. A system according to claim 25, wherein the prices of the orders of the set of linked orders are calculated from tiering assignments received from the trading floors by the trading system and price differentials for each credit tier received from the trading floors.

29. A system according to claim 25, wherein the orders of the set of linked orders are linked by deal amount and by deal status, whereby a change in the status in any of the plurality of linked orders causes the same change of status in all other orders in the set of linked orders.

30. A system according to claim 25, wherein the orders are matched on an anonymous trading system.

31. A system according to claim 25, wherein the orders are orders to trade a financial instrument.

32. A system according to claim 25, wherein the step of price adjusting, at the computerised price adjustment component, comprises the software storing, at the computerised price adjustment component, a table of price adjustments for each credit tier and storing, at the computerised price adjustment component, a table of credit tiers allocated to each potential taker trading floor by each potential maker trading floor trading on the system, adjusting at the computerised price adjustment component, the order price for each credit tier by the amounts stored in the table, and communicating the prices to potential taker trading floors from the computerised price adjustment component in accordance with their stored credit tier.

33. A system according to claim 27, wherein the computerised trading system includes a computerised order matching component having a computerised comparator for comparing credit tiers and a computerised component for rejecting a match between orders, and wherein the software communicates orders entered into the system to potential taker trading floors with which orders meet compatibility criteria, comprising comparing in the computerised comparator the tier identifier of an order with the credit tier assigned to each counterparty trading floor by the maker trading floor submitting the order, and rejecting, in the computerised component for rejecting a match, counterparties as ineligible to deal the order if the compared credit tiers are not the same.

34. A system according to claim 27, wherein the computerised trading system includes a computerised order matching component having a computerised comparator for comparing credit tiers and a computerised component for rejecting a match between orders, and wherein the software matches orders in the computerised order matching component received from a maker trading floor with orders received from taker trading floors, the order matching comprises comparing, in the computerised comparator, the credit tier allocated to the taker's trading floor by the maker's trading floor to the credit tier allocated to the maker's trading floor by the taker's trading floor; and rejecting, in the computerised component for rejecting a match, the match if the credit tiers compared do not match.

35. A system according to claim 31, wherein the financial instrument is a foreign exchange (FX) product.

36. A system according to claim 32, wherein the software stores, at the computerised price adjustment component, separate price adjustments to be applied to orders received from each potential maker trading floor trading on the trading system.

37. A system according to claim 32, wherein the computerised trading system trades a plurality of products, wherein the software stores tables of price adjustments at the computerised price adjustment component for each product traded on the system.

* * * * *